2,902,288

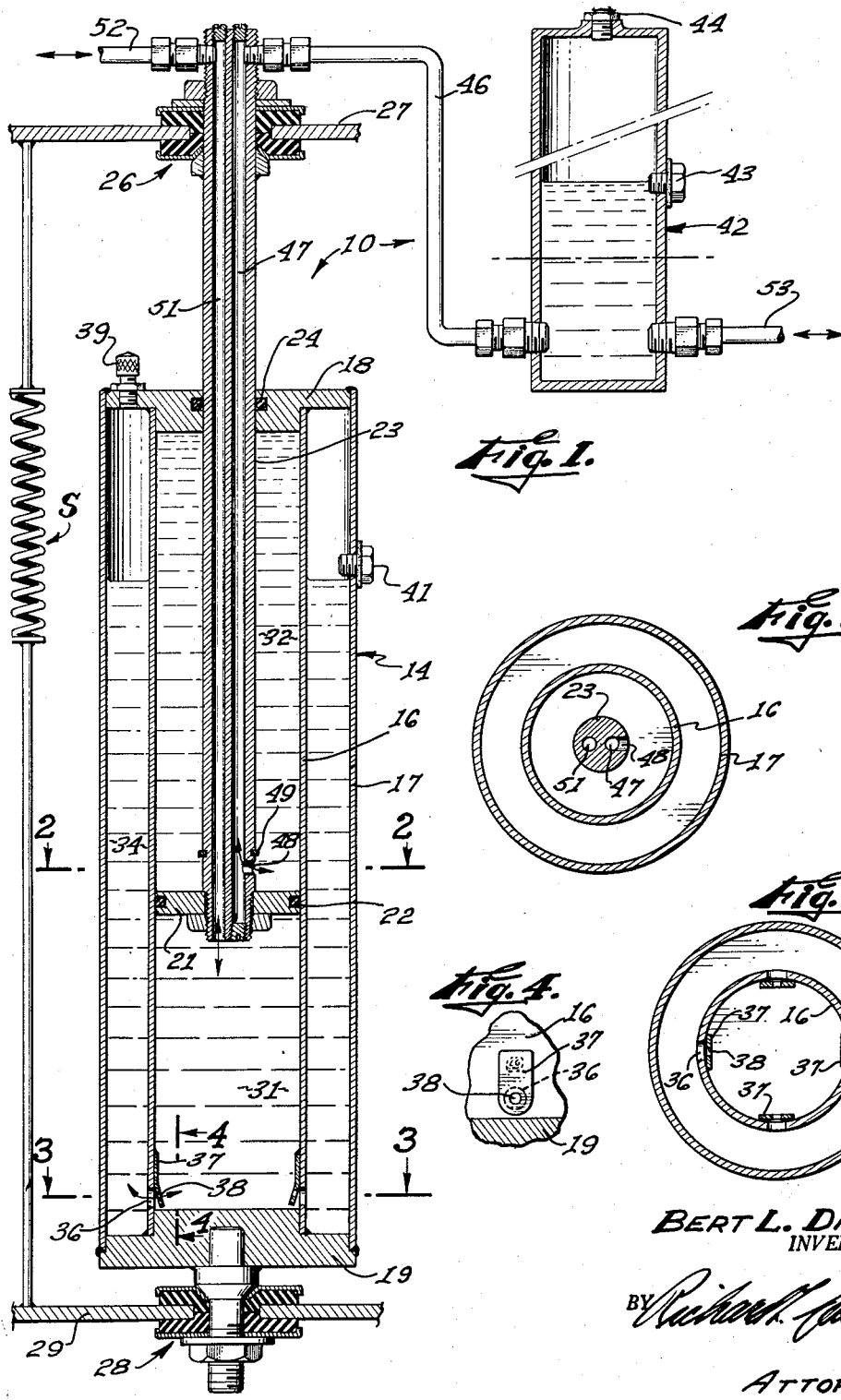

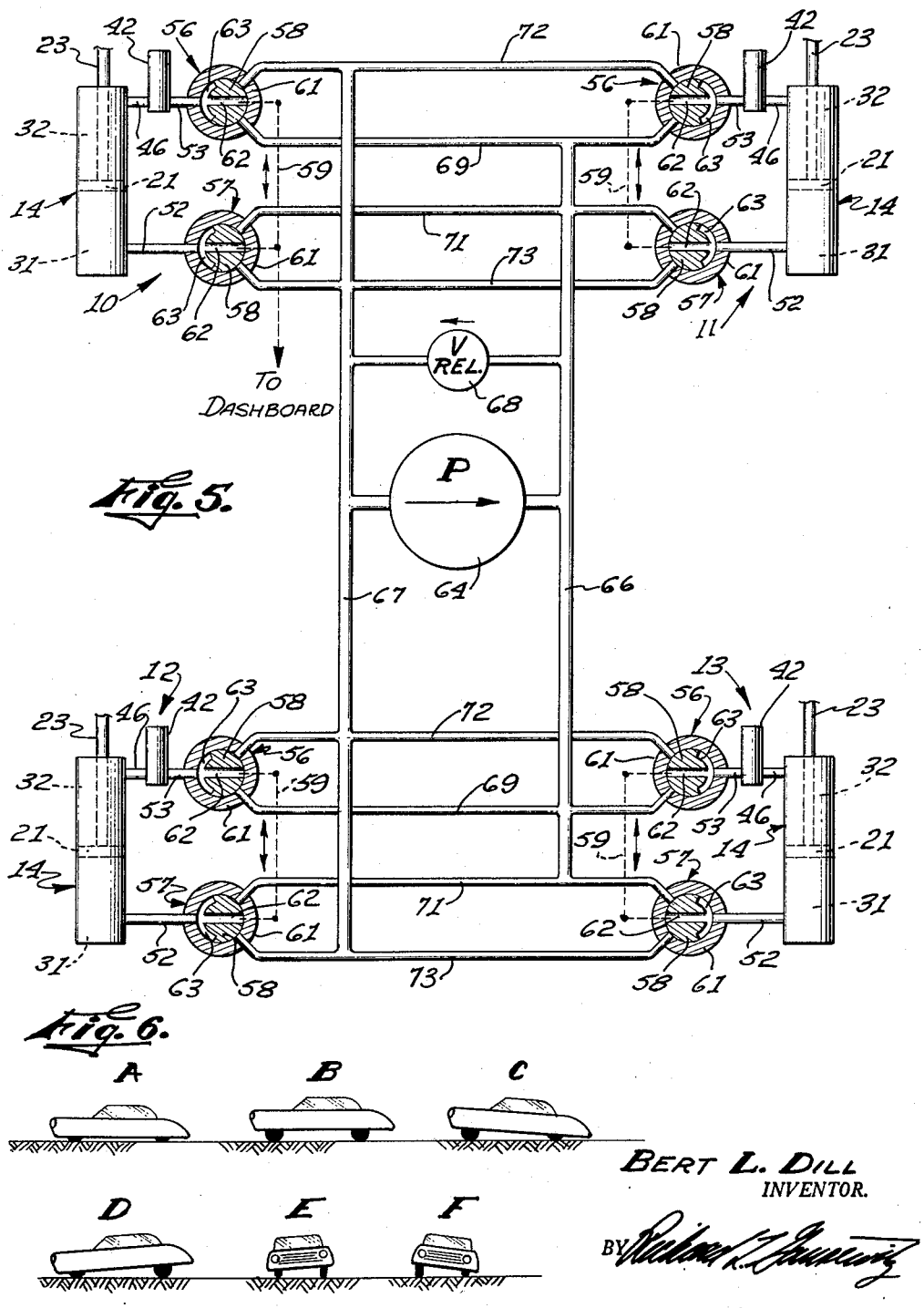

COMBINATION SHOCK ABSORBER, ELEVATOR, AND DEPRESSOR FOR MOTOR VEHICLES

Bert L. Dill, Costa Mesa, Calif.

Application May 2, 1957, Serial No. 656,676

4 Claims. (Cl. 280—43.23)

This invention relates to apparatus for effecting a shock absorbing action, and a selective elevating or lowering action, in motor vehicles such as automobiles and trucks.

Present day automobiles are constructed relatively low to the ground in order to improve their appearance and to provide increased safety because of lowered center of gravity. Such construction, however, results in numerous difficulties relative to backing out of steep driveways, travelling over rough roads, opening doors next to a curb, etc. These and other difficulties may be corrected by lifting the automobile body to a higher position than normal. There are also, however, a substantial number of situations in which it is desired to lower the automobile body to a lower position than normal. The latter type of situation occurs, for example, when it is desired to effect an extremely low center of gravity on smooth highways such as freeways or expressways, or to effect lowering of trucks or buses while travelling through low-clearance underpasses.

In view of the above and other factors characteristic of motor vehicles such as automobiles, trucks and buses, it is an object of the present invention to provide an apparatus for effecting not only a shock absorbing action, but also a selective body elevating and lowering action as desired by the vehicle operator.

An additional object is to provide apparatus for selectively elevating and lowering a vehicle body relative to the wheels in order to adjust headlights while the vehicle is loaded or pulling a trailer.

A further object is to provide means for adjusting the elevation of a vehicle body in order to facilitate travel over mountainous, rough or rocky roads, and to facilitate passage through water.

A further object is to provide means for raising or lowering truck bodies at loading docks, or while travelling through low-clearance underpasses.

A further object is to provide means for raising an automobile to permit door opening adjacent high curbs, or to permit backing out of steep driveways.

These and other objects and advantages of the invention will be more fully set forth in the following specification and claims, considered in connection with the attached drawings to which they relate.

In the drawings:

Figure 1 is a vertical central sectional view illustrating a combination shock absorbing, and elevating or lowering, means associated with one of the wheels of a vehicle;

Figure 2 is a transverse section on line 2—2 of Figure 1;

Figure 3 is a transverse section on line 3—3 of Figure 1;

Figure 4 is a fragmentary elevational view taken from station 4—4 of Figure 1;

Figure 5 is a hydraulic diagram illustrating the valve and conduit means for the entire vehicle, and showing in schematic form the shock absorbing and elevating means for the four wheels of the vehicle; and Figure 6 is a schematic view illustrating various elevated, lowered and tilted positions which may be assumed by an automobile incorporating the present invention.

Referring to the drawings, and particularly to Figure 5, the combination shock absorber and elevator units associated with the four wheels of the vehicle are numbered 10–13, and are identical in construction. In the present description it may be assumed that unit number 10 corresponds to the left front wheel, and number 11 to the right front wheel. Similarly, number 12 corresponds to the left rear wheel and number 13 to the right rear wheel. It is to be understood that additional units may be provided in the case of trucks and other vehicles having more than four wheels.

Since the various units 10–13 are identical, only the one, number 10, associated with the left front wheel will be described in detail, and with particular reference to Figures 1–4.

Referring to Figure 1, the unit 10 comprises a cylinder 14 having spaced, concentric cylindrical walls 16 and 17 closed at their ends by fixedly mounted discs 18 and 19.

Inner and outer cylindrical walls 16 and 17, respectively, may be associated with the upper and lower end discs 18 and 19, respectively, by any suitable means such as by arc welding. A piston 21 is slidably mounted in the chamber defined by inner cylinder wall 16, being sealingly associated with wall 16 such as by an O-ring 22. A relatively large diameter piston rod 23 is removably secured to the piston 21 and extends upwardly in sealing relationship through an opening in upper end disc 18, there being a second O-ring 24 around the piston rod. The upper end of piston rod 23 is suitably connected, by means of a connector 26, to the frame 27 of the vehicle. The lower end disc 19 is suitably connected by a connector 28 to the axle of the vehicle, a portion of such axle being schematically represented at 29.

It is to be understood that the connectors 26 and 28 may be of a resilient type, permitting limited pivotal movements of the frame and body relative to the cylinder and piston rod, but without permitting substantial longitudinal movements relative thereto.

The portion of the cylindrical chamber defined by inner wall 16, and below piston 21, may be designated the "raise" chamber and has been given the reference numeral 31. This is because admission of fluid into the chamber 31 tends to cause raising of piston 21, and thus the frame 27 and automobile body, relative to cylinder 14 and the axle. The portion of the chamber defined by inner wall 16 and above piston 21 may, conversely, be termed the "lower" chamber, and has been given the reference numeral 32.

"Raise" chamber 31 communicates through restricted orifice means with the annulus 34 between the outer and inner walls of cylinder 14. Such annulus 34, in effect, constitutes an extension of "raise" chamber 31, except that there is restricted communication therebetween as will next be described. The restricted orifice means preferably comprises a plurality of ports 36, illustrated as four in number, located at the bottom of chamber 31 and permitting passage of fluid between chamber 31 and annulus 34. Each port 36 is interiorly covered by a reed 37 which is adapted to close and partially block the port upon sudden compression of the fluid in chamber 31. The fluid must then flow from chamber 31 into chamber 34 through a smaller diameter port 38 (Figure 4) in the reed. Return flow of fluid from chamber 34 to chamber 31 effects opening of the reed, and consequent relatively free communication through the larger ports 36.

The upper portion of annulus 34 is filled with a compressible fluid, preferably an inert gas such as argon or helium. Suitable valve means 39 are provided to admit such gas. A suitable fill plug means 41 is provided, in spaced relation below upper end disc 18, for admission of liquid into the system. The liquid preferably comprises a suitable hydraulic fluid, and fills the entire system except for the portion of annulus 34 above fill plug means 41, and the upper portion of an accumulator to be described hereinafter.

The accumulator has been given the reference numeral 42, and is illustrated to comprise a cylinder having a fill plug means 43 spaced from the upper end thereof, and a valve means 44 adapted to admit a compressible fluid, such as argon or other inert gas, into the space above the fill plug means.

At its lower portion, accumulator 42 communicates through a conduit 46 with the upper end of a passage 47 extending longitudinally of piston rod 23. Passage 47 terminates at its lower end in a port 48 which communicates with "lower" chamber 32 a short distance above piston 21. A snap ring 49 is provided to prevent the piston rod 23 from being elevated sufficiently to cause blocking of port 48. A second passage, numbered 51, is provided in piston rod 23 to connect "raise" chamber 31 to a conduit 52. Conduit 52, and also a conduit 53 connected to accumulator 42 opposite the connection thereof to conduit 46, are connected into a hydraulic system shown in Figure 5 and which will next be described.

The hydraulic system includes a pair of valves 56 and 57 for each wheel of the vehicle, and preferably operated, either manually or by electrical control, from the dashboard. The valves 56 and 57 for each wheel operate conjointly, their cores 58 being connected as indicated at 59. The cores 58, which are rotatably mounted in suitable housings 61, are formed with a diametric passage 62 terminating at one end in an arcuate recess or passage 63. The arcuate recesses of valves 56 communicate at all times with the conduits 53 leading to accumulators 42. Correspondingly, the arcuate recesses 63 for valves 57 communicate at all times with conduits 52 leading to "raise" chambers 31.

A pump, preferably a positive acting pump such as a gear pump, is indicated at 64 and may be driven by any suitable motor element in the vehicle. The pump discharges into an outlet line 66, and receives fluid from an inlet or return line 67. These lines are connected by a relief valve 68 which permits recirculation of hydraulic fluid when the pump 64 is operating and none of the valves 56 or 57 is open. Relief valve 68 is of the high pressure type, so that it will not operate when it is desired to use the pump fluid for elevating or lowering purposes.

Outlet line 66 from pump 64 is connected through corresponding lines 69 to valves 56, and through lines 71 to valves 57. Return line 67 is connected through lines 72 to valves 56, and through lines 73 to valves 57. The locations of lines 69 and 71—73 relative to valve housings 61 are such that when the valve cores 58 are in their positions corresponding to upward shifting of the connectors 59, diametric passages 62 of valves 56 are registered with lines 72, and diametric passages 62 of the valves 57 are registered with lines 71. Conversely, when the cores 58 are in their rotated positions corresponding to lowering of connectors 59, diametric passages 62 of the valves 56 will be registered with lines 69, and diametric passages 62 of the valves 57 will be registered with lines 73.

*Operation*

The system described herein is primarily adapted for use on vehicles having conventional springs, indicated schematically at S in Figure 1, although it is possible to use the present system on vehicles in which no springs are incorporated. During normal operation of the vehicle, the condition of the components associated with each wheel of the vehicle is approximately as shown in Figure 1, piston 21 then being in an intermediate position. All of the valves 56 and 57 are then shut, as shown in Figure 5, and pump 64 is normally not operating.

Let it be assumed that the left front wheel of the vehicle hits a bump. The bump will then cause axle 29 to effect raising of cylinder 14 of the combination shock absorber and elevator means 10, with consequent reduction in the volume of "raise" chamber 31. Since flow of liquid through conduits 51 and 52 is blocked by the closed valve 57, the liquid in "raise" chamber 31 is forced through the small diameter ports 38, reed valves 37 then being closed as previously stated. This provides a restricting and shock absorbing action, and increases the amount of liquid in the annulus 34 to cause compression in the gas present in annulus 34 above the liquid therein. The compression of the gas at the upper end of annulus 34 provides a very substantial additional shock absorbing action.

After the wheel has passed over the bump, the axle 29 and cylinder 14 will lower, which will increase the volume of chamber 31. Liquid in annulus 34 will then rush through ports 36, reed valve 37 then being open, and will maintain chamber 31 in full condition. Such rushing of liquid through the ports 36 will be effected largely by the compressed gas at the upper end of the annulus 34.

The above described shock absorbing action is not only effected by the "raise" chamber 31, but also by the "lower" chamber 32. Thus, when the wheel strikes a bump to reduce the volume of chamber 31, the volume of chamber 32 is correspondingly increased. This permits flow of liquid from accumulator 42 through conduit 46 and passage 47 into the chamber 32. On rebound, that is to say upon increase in the size of chamber 31 and decrease in the size of chamber 32 after the wheel passes over the bump, fluid is forced from chamber 32 through port 48, passage 47 and conduit 46 into accumulator 42, which effects compression in the gas at the upper end of the accumulator. Such compression of the gas, and the somewhat restricted flow of the liquid through the port 48 and passages, provides a damping and shock absorbing action which prevents bounding or lurching after the bump is passed over.

The operation of the means 10-13 for raising and lowering the vehicle relative to the wheel therebeneath will next be stated. Since these means are identical, only the means 10 associated with left front wheel of the vehicle will be described in detail. Let it be assumed that it is desired to lower the left front portion of the vehicle. Connector 59 of means 10 is then shifted downwardly to its lower position, at which time diametric passages 62 of valves 56 and 57 register with lines 69 and 73, respectively. Fluid then flows from pump 64 through line 66 and into line 69, thence through passage 62 and recess 63 (of valve 56) into conduit 53 and thus into the accumulator 42. Fluid is then forced from the accumulator through conduit 46, passage 47 and port 48 into "lower" chamber 32. The increase in the amount of fluid in chamber 32 effects downward shifting of the piston 21 to lower the frame 27 relative to the wheel, and despite the operation of the springs of the vehicle. The left front portion of the vehicle is thus lowered, as desired. The downward shifting of piston 21 is made possible since fluid drains from chamber 31 through passage 51, conduit 52, recess 63 of valve 57, diametric passage 62, and lines 73 and 67 back to the inlet of pump 64.

To effect raising of the left front portion of the vehicle, the position of the valves 56 and 57 is reversed. Fluid then flows from the pump through lines 66 and 71 to passage 62 of valve 57, and thence through recess 63 and conduit 52 to "raise" chamber 31. Upward shifting of the piston 21 is thus effected, and is possible since fluid drains from "lower" chamber 32 through passage 47, conduit 46, accumulator 42, conduit 53, recess 63 of valve 56, passage 62 thereof, and lines 72 and 67 back to the inlet of pump 64.

Referring to Figure 6, it will be understood that the vehicle may be lowered relative to all four wheels, so that it will be very low to the ground, as shown at A. The reverse condition is shown at B, in which the vehicle is raised relative to all four wheels. The showing at C illustrates a condition in which the front of the vehicle is raised, and the rear thereof lowered to effect upward tilting of the vehicle, and the reverse condition (effecting downward tilting) is illustrated at D. The showing at E illustrates a condition in which the right side of the vehicle is lowered relative to the wheels, and the left side is raised, whereas the showing at F illustrates the converse condition.

From the above it will be understood that any desired raised, lowered, or tilted condition may be achieved with the present system, in combination with the desired shock absorbing operation. The vehicle may be locked at the elevated, lowered, or tilted positions by merely closing valves 56 and 57.

Various embodiments of the present invention, in addition to what has been illustrated and described in detail, may be employed without departing from the scope of the accompanying claims.

I claim:

1. A combination shock absorbing and elevating system for an automobile, truck or similar motor vehicle, which comprises a double walled cylinder connected at its lower end to an axle of said vehicle, a piston slidably mounted in the inner chamber of said cylinder, a piston rod connected to said piston and extending upwardly through the upper end of said cylinder, means to connect the upper portion of said piston rod with the frame of said vehicle, first passage means extending through said piston rod and communicaing with said inner chamber below said piston, second passage means extending through said piston rod and communicating with said inner chamber above said piston, restricted orifice means provided at the lower end of the wall of said inner chamber for connecting said inner chamber below said piston with the annulus between the inner and outer walls of said cylinder, an accumulator connected at its lower end to said second passage means, and means to maintain gas in the upper portion of said accumulator and in the upper portion of said annulus.

2. The invention as claimed in claim 1, in which check valve means are provided in said restricted orifice means to lessen the rate of flow from said inner chamber below said piston to said annulus, and permit increased flow from said annulus back to said inner chamber below said piston.

3. The invention as claimed in claim 1, in which said system includes pump and valve means adapted when in one position to introduce hydraulic fluid into the lower portion of said accumulator and at the same time drain hydraulic fluid from said first passage means, and when in another position to introduce fluid into said first passage means and drain fluid from said lower portion of said accumulator.

4. A combination shock absorber and elevator apparatus for a motor vehicle, which comprises a cylinder element, a piston element slidably mounted in said cylinder element, means to associate one of said elements with the frame of said vehicle and the other of said elements with a wheel thereof, means to define a first chamber communicating with said cylinder element on one side of said piston element, means to define a second chamber communicating with said cylinder element on the other side of said piston element, means to maintain compressible gas in said first chamber and in said second chamber to provide a shock absorbing action upon longitudinal shifting of said piston element in said cylinder element, means operable independently of said gas to pump liquid first into said cylinder element on said one side of said piston element and then into said cylinder element on said other side of said piston element, restricted orifice means to effect communication between said first and second chambers and said cylinder element, and reed valve means in said restricted orifice means between at least one of said first and second chambers and said cylinder element, said reed valve means having port means therein and smaller in size than said restricted orifice means.

References Cited in the file of this patent

UNITED STATES PATENTS

| | | |
|---|---|---|
| 51,956 | Merlett | Jan. 9, 1866 |
| 2,257,913 | Maranville | Oct. 7, 1941 |
| 2,443,433 | Sammori | June 15, 1948 |
| 2,452,110 | Dourte | Oct. 26, 1948 |
| 2,620,182 | Marston | Dec. 2, 1952 |
| 2,804,311 | Pobanz | Aug. 27, 1957 |
| 2,805,080 | Perez | Sept. 3, 1957 |